United States Patent [19]

Organek et al.

[11] Patent Number: 5,910,061
[45] Date of Patent: *Jun. 8, 1999

[54] BALL RAMP DRIVELINE CLUTCH ACTUATOR WITH UNIDIRECTIONAL APPLY

[75] Inventors: Gregory J. Organek, Detroit; David M. Preston, Clarkston, both of Mich.

[73] Assignee: Eaton Corporation, Cleveland, Ohio

[*] Notice: This patent is subject to a terminal disclaimer.

[21] Appl. No.: 08/940,330

[22] Filed: Sep. 30, 1997

[51] Int. Cl.[6] .............................. F16D 27/11; F16D 13/04
[52] U.S. Cl. ........................ 475/149; 192/35; 192/54.52; 192/84.96; 192/93 A
[58] Field of Search ..................................... 475/149, 151, 475/153, 157, 331; 192/20, 35, 54.52, 54.4, 84.7, 84.96, 48.92, 70.23, 93 A

[56] References Cited

U.S. PATENT DOCUMENTS

| | | |
|---|---|---|
| 1,974,390 | 9/1934 | Eason . |
| 2,623,619 | 12/1952 | Clerk ............................................ 192/35 |
| 2,861,225 | 11/1958 | Mergen . |
| 2,937,729 | 5/1960 | Sperr, Jr. . |
| 3,000,479 | 9/1961 | Mosbacher ................................ 192/35 |
| 4,416,359 | 11/1983 | Miller ...................................... 192/54.4 |
| 4,718,303 | 1/1988 | Fogelberg ............................... 192/35 X |
| 4,805,486 | 2/1989 | Hagiwara et al. . |
| 5,078,249 | 1/1992 | Botterill . |
| 5,092,825 | 3/1992 | Goscenski . |
| 5,269,730 | 12/1993 | Hirota ................................... 475/149 X |
| 5,441,137 | 8/1995 | Organek et al. ........................... 192/35 |
| 5,464,084 | 11/1995 | Aoki et al. ................................ 192/35 |
| 5,469,948 | 11/1995 | Organek et al. ........................... 192/35 |
| 5,485,904 | 1/1996 | Organek et al. ........................... 192/35 |
| 5,505,285 | 4/1996 | Organek ................................... 192/35 |
| 5,638,933 | 6/1997 | Matsumoto et al. .............. 192/54.52 X |

*Primary Examiner*—Khoi Q. Ta
*Assistant Examiner*—Scott Lund
*Attorney, Agent, or Firm*—Loren H. Uthoff, Jr.; Howard D. Gordon

[57] ABSTRACT

A vehicle driveline clutch using a ball ramp actuator including a ball ramp mechanism supplying a clamping force on a clutch disc in response to an electromagnetic field where the clutch clamping force is maintained and increased with clutch slip using a planetary gearset having an annulus connected to rotate with a clutch ring and a sun gear connected to rotate with the transmission input shaft. A primary one-way clutch acts between the planetary gearset and a flywheel work in conjunction with the planetary gearset in preventing rotation of the control ring in a direction to deactivate the ball ramp mechanism and a plurality of secondary one-way clutches acting in the planetary gearset with a secondary one-way clutch acting on each planet gear and supported on the clutch ring which is frictionally connected to the ball ramp control ring upon energization of an electrical coil by a clutch control unit thereby creating relative rotational motion between the control ring and an actuation ring causing a plurality of rolling elements to travel along identical opposed variable depth ramps thereby creating an axial separation force between the control ring and the actuation ring generating the clamping force on the clutch disc. Upon slippage of the clutch disc, the planetary gearset acts in concert with the primary one-way clutch to further energize the ball ramp actuator to increase the clutch clamping force when the vehicle is in either a drive or coast driving mode.

8 Claims, 3 Drawing Sheets

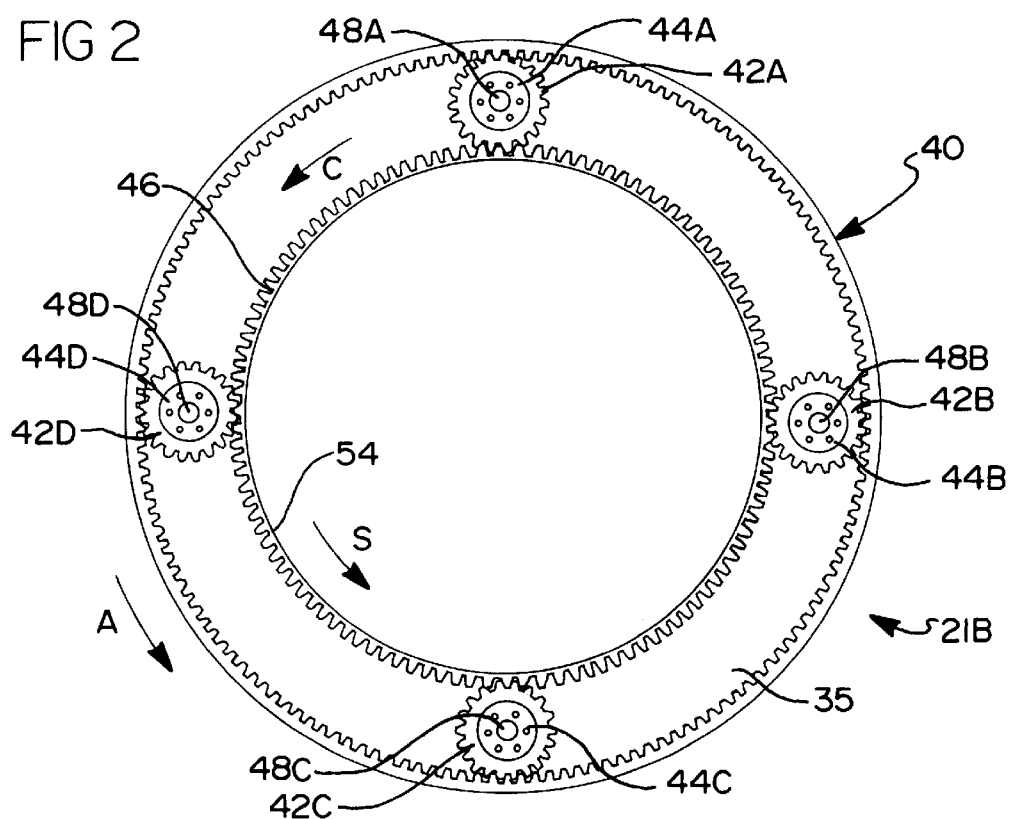
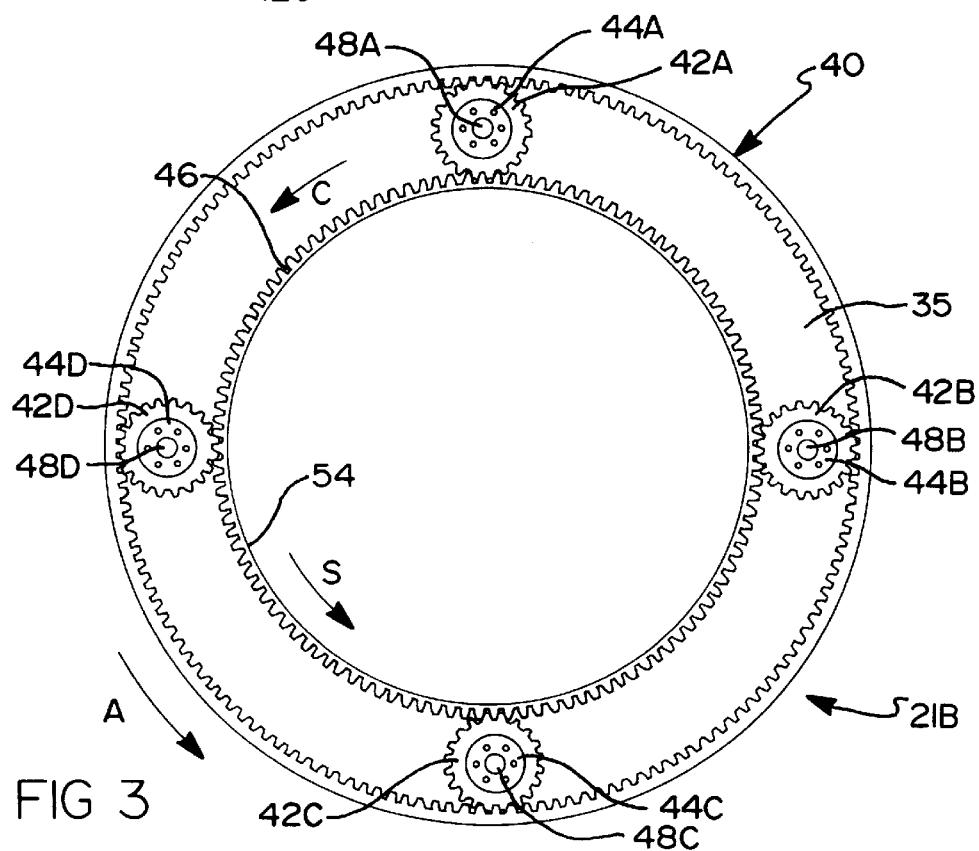

BALL RAMP DRIVELINE CLUTCH ACTUATOR WITH UNIDIRECTIONAL APPLY

RELATED APPLICATIONS

The present application relates to application U.S. Ser. No.: 08/766,838, filed on Dec. 13, 1996 entitled "Driveline Clutch With Unidirectional Apply Ball Ramp" and to U.S. Ser. No.: 08/941,360, filed on Sep. 30, 1997 entitled "Ball Ramp Driveline Clutch Actuator With Unidirectional Apply Using Planetary Gearset" both assigned to the same assignee, Eaton Corporation, as this application.

BACKGROUND OF THE INVENTION

1. Field of the Invention

The present invention relates to a vehicle driveline clutch and, more particularly, to a driveline clutch where a friction disc is clamped to an engine flywheel using a ball ramp actuator wherein a planetary gearset having one-way clutches on the planetary gears in conjunction with a primary one-way clutch provide driveline clutch lock-up under both drive and coast conditions.

2. Description of the Prior Art

Driveline master clutches commonly use a plurality of springs to clamp a friction disc to an engine flywheel. The springs are disposed within a pressure plate assembly which is bolted to the flywheel. A mechanical linkage that controls the pressure plate spring mechanism is displaced by the operator to control the lock-up and release of the driveline clutch.

Efforts to automate the operation of the driveline clutch using electronics are currently underway. It is known to use an electromechanical or hydraulic actuator connected to the mechanical linkage to, in essence, replace the operator for more accurate clutch operation during transmission shifting. Using such an actuator, the mechanical linkage is moved in response to an electrical control signal generated by a central microprocessor used to process a variety of vehicle sensor inputs based on operating conditions to determine when and in what manner the driveline clutch should be activated or deactivated.

The use of a ball ramp actuator to load a clutch pack in a vehicle driveline differential is known. U.S. Pat. Nos. 4,805,486 and 5,092,825, the disclosures of which are hereby incorporated by reference, disclose limited slip differentials where a clutch pack is loaded in response to the activation of a ball ramp actuator initiated by rotation of a servo motor or a solenoid driven brake shoe on an activation ring. The advantage of the ball ramp mechanism over other actuators is that it converts rotary motion into axial motion with very high force amplification, often 100:1 or greater. A ball ramp actuator has also been utilized in a vehicle transmission to engage and disengage gearsets by loading a gear clutch pack in response to a signal as disclosed in U.S. Pat. No. 5,078,249, the disclosure of which is hereby incorporated by reference.

In both of these vehicle applications, one side of the ball ramp actuator, commonly called a control ring, reacts against case ground through the force induced by an electromagnetic field generated by a coil or is rotated by an electric motor relative to case ground. To generate greater clamping forces, the electrical current supplied to the coil or motor is increased thereby increasing the reaction of the control ring to case ground which rotates the control ring relative to an actuation ring thereby causing rolling elements to engage ramps in the control and actuation ring which increase the axial movement and clamping force on the clutch pack.

It is also known to use a ball ramp actuator to load a vehicle driveline clutch as disclosed in U.S. Pat. Nos. 1,974,390; 2,861,225; 3,000,479; 5,441,137; 5,469,948; 5,485,904 and 5,505,285, the disclosures of which are hereby incorporated by reference. One problem with the use of a ball ramp actuator to supply the vehicle driveline clutch clamping force is that the mechanics of prior art unidirectional ball ramp mechanisms result in a loss of clamping force when the vehicle is in a coast mode. Once the engine power is reduced and the driveline is actually overrunning the engine (coast mode), the prior art ball ramp actuator with single ramp unidirectional actuation will disengage the clutch thereby eliminating engine braking of the vehicle.

A ball ramp actuated clutch using a unidirectional ball ramp having only a single ramp angle, will cause the clutch to disengage when the engine is not supplying rotational energy into the transmission such as when the vehicle is coasting. When coasting, the flywheel is no longer supplying rotational energy to either the transmission or to the ball ramp actuator. In this circumstance, the relative rotation of the actuation ring and control ring has been reversed such that the ball ramp axial displacement is collapsed thereby allowing the pressure plate to pull away from the clutch disc. The result is that the engine is disengaged from the transmission and any engine braking effect is eliminated.

A bidirectional ball ramp actuated clutch is disclosed in U.S. Pat. Nos. 2,937,729 and 5,505,285. Using this more expensive and complicated technology, the ball ramp actuator incorporates bidirectional ramps which provide activation when there is relative rotation between the control ring and the actuation ring in either direction. However, the ball ramp must transition through the nonactivated state which will result in temporary undesirable clutch slippage and the components are more expensive to fabricate than a unidirectional unit. Also, a bidirectional ball ramp will have reduced rotational travel between the control ring and the actuation ring in a given package size as compared to a unidirectional ball ramp mechanism. Thus, a unidirectional ball ramp mechanism is preferred if it can be made to activate in both vehicle drive and coast operating modes.

The ball ramp actuator comprises a plurality of rolling elements, a control ring and an opposed actuation ring where the actuation ring and the control ring define at least three opposed single ramp surfaces formed as circumferential semi-circular grooves, each pair of opposed grooves containing one rolling element. A thrust bearing is interposed between the control ring and a housing member, rotating with and connected to the input member such as a flywheel. An electromagnetic coil is disposed adjacent to one element of a control clutch so as to induce a magnetic field that loads the control clutch which in turn applies a force on the control ring of the ball ramp actuator. The control clutch can be similar to those commonly used for vehicle air conditioning compressors, or a cone type control clutch to increase the transmitted actuation force.

SUMMARY OF THE INVENTION

The present invention is characterized by a flywheel (input element) driven by a prime mover and a transmission input shaft (output element) coupled through a ball ramp actuated clutch. The ball ramp mechanism has a plurality of unidirectional variable depth grooves (ramps) and an actuation ring having single direction variable depth grooves at least partially opposed and substantially similar in geometry to those of the control ring. Examples of ball ramp actuator clutch systems are shown in U.S. Pat. Nos. 1,974,390; 2,861,225; 2,937,729; 3,000,479; 5,485,904 and 5,505,285. The actuation ring is prevented from counter rotating upon clutch lock-up in the vehicle coast mode through the use of a planetary gearset and a primary one-way clutch between the carrier ring and the input element with a secondary one-way clutch on each of a plurality of planetary gears. Thus, using the present invention, the ball ramp mechanism does not transition through the nonactivated state when the vehicle goes from a drive mode to a coast mode and clutch slippage is greatly reduced or eliminated completely. Once the electromagnetic coil is energized the ball ramp mechanism can only increase clamping force independent of the vehicle operating condition.

The electromagnetic coil is used to activate a control clutch which frictionally couples the control ring through the planetary gearset and the primary one-way clutch to the transmission input shaft. When energized by the coil, the ball ramp mechanism provides a clamping force on the clutch friction disc where the amplitude of the clamping force immediately increases whenever there exists a rotational speed differential between the input flywheel and the input shaft of the vehicle transmission. According to the present invention, the amplitude of the clamping force is held at a given level or increased as long as the coil is energized by action of a primary one-way clutch acting between the planetary carrier ring and the input element and secondary one-way clutches acting on individual planet gears in the planetary gearset so that when the vehicle enters a coasting mode (where the engine is braking as opposed to driving the vehicle) the ball ramp actuator remains fully activated. Clutch slippage in the drive mode will cause the ball ramp mechanism to increase the clamping force on the clutch disc. Also, in the coasting mode, if for some reason there is clutch slippage, the planetary gearset provides for additional relative rotation between the control ring and the actuation ring in the proper direction to increase the clamping force on the clutch friction discs.

One provision of the present invention is to prevent a ball ramp actuated clutch from disengaging when the input torque is reversed.

Another provision of the present invention is to prevent a ball ramp actuated clutch having unidirectional ramps from disengaging when the driveline torque is in a coast mode by locking the rotational orientation between a control ring and an actuation ring using one-way clutches acting on the planet gears of a planetary gearset and a primary one-way clutch between the carrier ring and the flywheel.

Another provision of the present invention is to allow a ball ramp actuated driveline clutch rotationally linking an input element to an output element having unidirectional ramps to increase its engagement level when the driveline torque is in a coast mode utilizing a planetary gearset and a one-way clutch acting between a carrier ring and the input element.

Another provision of the present invention is to allow a driveline clutch actuated by a ball ramp actuator having unidirectional ramps to increase its actuation force when the transferred driveline torque reverses direction utilizing a planetary gearset where each planetary gear is supported on a one-way clutch nonrotatably supported on a support pin attached to a carrier ring.

Still another provision of the present invention is to allow a driveline clutch actuated by a ball ramp actuator having unidirectional ramps to increase its actuation force when the transferred driveline torque reverses direction utilizing a planetary gearset and a primary one-way clutch where a plurality of one-way clutches prevent reverse rotation of the planetary gears relative to the transmission input shaft.

BRIEF DESCRIPTION OF THE DRAWINGS

FIG. 2 is a partial cross-sectional view of the planetary gearset of the present invention taken along line II—II of FIG. 1 with the vehicle driveline in a drive mode;

FIG. 3 is a partial cross-sectional view of the planetary gearset of the present invention taken along line II—II of FIG. 1 with the vehicle driveline in a coast mode;

DETAILED DESCRIPTION OF THE PREFERRED EMBODIMENT

Figure 1:
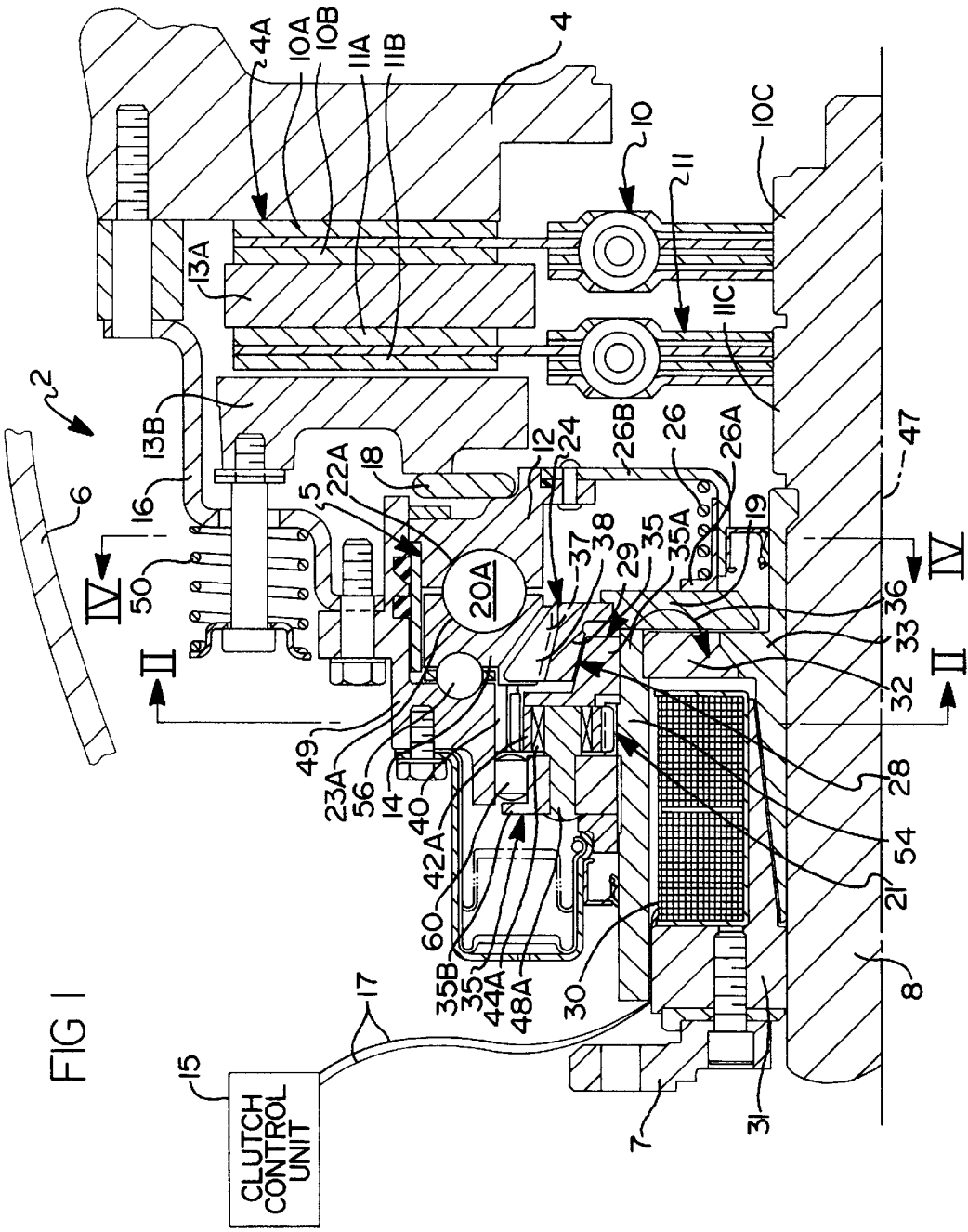
FIG. 1 is a partial cross-sectional view of the driveline clutch assembly of the present invention.

For purposes of promoting the understanding of the principles of the invention, reference will now be made to the embodiment illustrated in the drawings and specific language will be used to describe the same. It will nevertheless be understood that no limitation on the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. For example, the terms "forward" and "rearward" will refer to directions forward and rearward of the clutch assembly as normally mounted in a vehicle. The terms "rightward" and "leftward" will refer to directions in the drawings in connection with which the terminology is used. The terms "inwardly" and "outwardly" will refer to directions toward and away from respectively, the geometric center of the apparatus. The terms "upward" and "downward" will refer to directions as taken in the drawings in connection with which the terminology is used. All foregoing terms mentioned above include the normal derivatives and equivalents thereof.

Referring now to the drawings, which are not intended to limit the present invention, FIG. 1 is an axial cross-sectional view of a master driveline clutch assembly 2 of the type in which the present invention may be utilized. The main driveline clutch assembly 2 includes a flywheel 4 also referred to as an input element having a friction surface 4A rotatably driven by a prime mover (not shown) such as an internal combustion engine by its output crankshaft (not shown) which is coupled to a transmission (not shown) by a driveline clutch assembly 2 actuated by a ball ramp mechanism 5. A clutch bellhousing 6 surrounds the driveline clutch assembly 2 and supports the transmission including the transmission input shaft 8 also referred to as an output element which extends to nonrotatably engage a first clutch disc 10 having friction disc 10A and friction disc 10B through splines 10C at the left end of the transmission input shaft of where the transmission input shaft 8 then extends rightward to drive the transmission gearing. Likewise, a second clutch disc 11 having friction disc 11A and friction disc 11B engages the transmission input shaft 8 through splines 11C. The first clutch disc 10 is clamped between the flywheel 4 and an intermediate pressure plate 13A while the second clutch disc 11 is clamped between the intermediate pressure plate 13A and a primary pressure plate 13B. An actuation ring 12, acts on the Bellville washer 18 to apply an axial force on the primary pressure plate 13B against the second clutch disc 11 and the intermediate pressure plate 13A against the first clutch disc 10 against the flywheel 4 at the flywheel friction surface 4A thereby transferring the rotational power from the prime mover to the transmission through the transmission input shaft 8 and eventually to the rest of the vehicle driveline.

In prior art systems, the clutch pressure plate is forced toward the flywheel using a plurality of loading springs. When the operator wishes to disengage the clutch disc, a mechanical release mechanism is activated by the operator's foot and leg overcoming the force of the springs thereby allowing the clutch disc to slip relative to the flywheel. It should be understood, however, that neither the activation springs nor the mechanical release mechanism are features of the present invention. According to the present invention, a ball ramp mechanism 5 is used to force the actuation ring 12 toward the flywheel 4 which is controlled by the clutch control unit 15 electronically taking the place of an operator during transmission shifting sequences.

Figure 4:
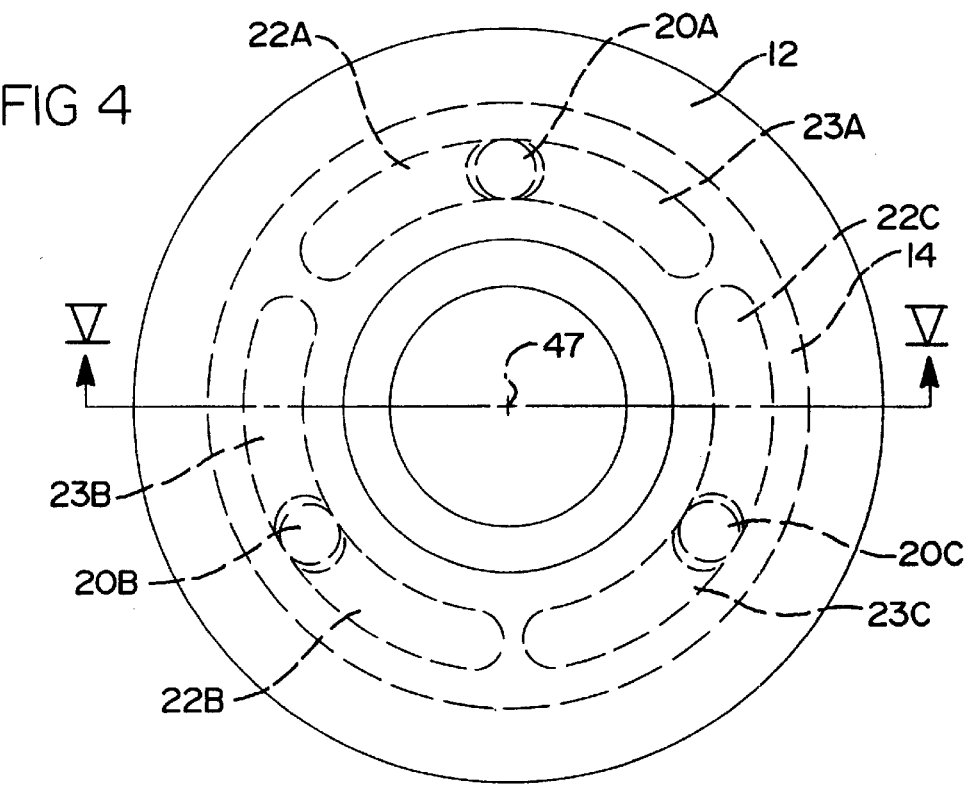
FIG. 4 is an axial cross-sectional view of the ball ramp mechanism of the present invention taken along line IV—IV of FIG. 1.
Figure 5:
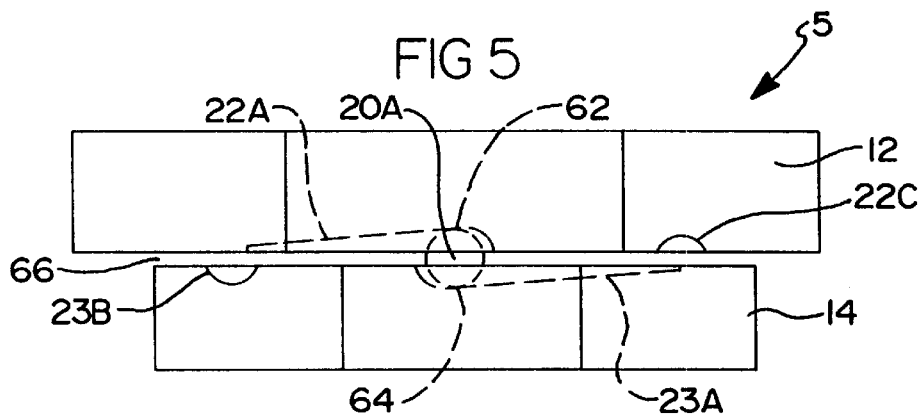
FIG. 5 is a cross-sectional view of the ball ramp mechanism of the present invention taken along line V—V of FIG. 4 with the ball ramp mechanism in a nonenergized state.
Figure 6:
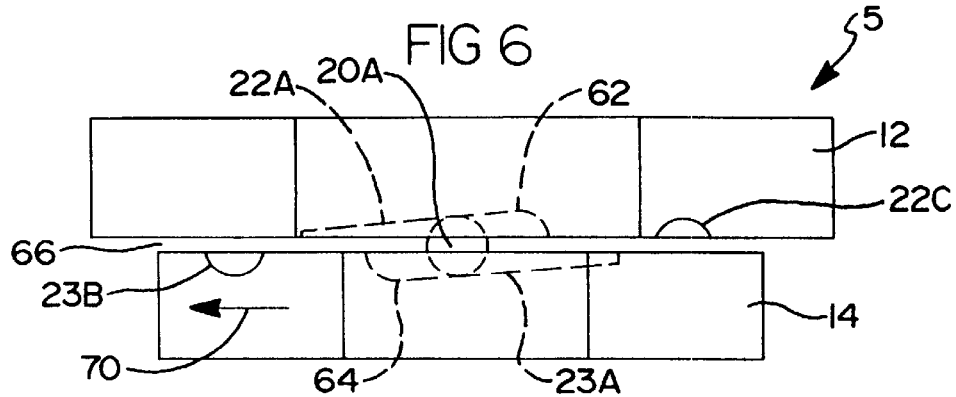
FIG. 6 is a cross-sectional view of the ball ramp mechanism of the present invention taken along line V—V of FIG. 4 with the ball ramp mechanism in an energized state.

The clutch bellhousing 6 partially encloses the driveline clutch assembly 2 including the ball ramp mechanism 5 of the present invention. Ball ramp actuators that react the control ring 14 to ground are well known in the art and have been used to load transmission gear clutches as disclosed in U.S. Pat. No. 5,078,249, and differential clutch packs as disclosed in U.S. Pat. No. 5,092,825 where a ball ramp control ring is reacted against case ground by a coil or motor with gearing. In essence, relative rotational motion between the control ring 14 and the actuation ring 12 causes one or more rolling elements 20A, 20B and 20C (see FIG. 6), which can be spherical shaped elements or cylindrical rollers, to be moved along a like number of opposed ramps 23A, 23B and 23C formed in the control ring 14 and ramps 22A, 22B and 22C formed in the actuation ring 12 respectively all components generally rotating about axis of rotation 47. Ramps 22A, 22B, 22C, 23A, 23B and 23C have a variable axial depth which is unidirectional. FIGS. 4–6 illustrate this geometry with more detail and precision, reference to which is made subsequently.

The control ring 14 contains the ramps 23A, 23B and 23C and is frictionally rotatably connected to the clutch ring 35 when the coil 30 is energized. The control clutch plate 19 is drawn toward the coil pole 32 when the coil 30 is energized by the clutch control unit 15 through electrical connectors 17. The annular electrical coil 30 encircles the transmission input shaft 8 and is supported by the coil support 31 attached to the clutch bellhousing 6 through the support extension 7. The electrical coil 30 is positioned in close proximity to the coil pole 32 separated by an air gap where the coil pole 32 is nonrotatably supported on the transmission input shaft 8 on the splined sleeve 33. The splined sleeve 33 and the coil plate 32 and the sun gear 54 all rotate with the transmission input shaft 8. The electrical coil 30 is positioned to be partially enclosed by the coil pole 32 and is separated from it by a small air gap. The coil 30 is mounted to the clutch bellhousing 6 and therefore held stationary while the coil pole 32 rotates according to the rotation of the input shaft 8. The coil 30 generates an electromagnetic flux 36 shown by arrows 36 in FIG. 1 which travels through the coil pole 32 into the control clutch plate 19 and back through the coil pole 32 into the coil 30. This electromagnetic flux creates a force which tends to draw the clutch plate 19 into the coil pole 32 thereby creating a force through contact of the clutch extension 29 on the clutch ring 35 creating a resulting torque in the control ring 14 (assuming a rotational speed differential between the flywheel 4 and the transmission input shaft 8) which activates the ball ramp mechanism 5 through the planetary gearset 21 and a primary one-way clutch 60 which rotates the control ring 14 in a locking direction when the vehicle is in a coast or drive mode. In other words, when the vehicle is in a drive mode, the planetary gearset 21 is locked by the locking action of the secondary one-way clutches 44A, 44B, 44C, 44D and the primary one-way clutch 60 free wheels. When in the coast mode, the primary one-way clutch 60 is locked, and the secondary one-way clutches allow the planetary gears 42A, 42B, 42C, 42D to rotate. In both the drive and coast modes relative rotation in either direction of the flywheel 4 and the transmission input shaft 8 causes the ball ramp mechanism 5 to activate. The primary one-way clutch 60 operates between the support block 49 and an outer clutch ring 35B. Carrier pins 48A, 48B, 48C and 48D (see FIG. 2) are attached between the clutch ring 35A and the outer clutch ring 35B and support the planet gears 42A, 42B, 42C and 42D through respective secondary one-way clutches 44A, 44B, 44C and 44D.

When the clutch discs 10 or 11 are unclamped or start to slip due to excessive torque supplied by the prime mover (engine) through the flywheel 4, there is relative rotation between the control ring 14 and the actuation ring 12 thereby forcing the rings 12 and 14 axially further apart (as described in further detail infra) thereby increasing the clamping force of the actuation ring 12 on the clutch discs 10 and 11 at the friction pads 10A, 10B, 11A and 11B between the main pressure plate 13A and the intermediate pressure plate 13A and the flywheel 4. This occurs through a small range of rotational motion of the control ring 14 relative to the actuation ring 12 and provides an automatic, virtually instant, clamping force adjustment should any relative rotation occur between the flywheel 4 and the transmission input shaft 8.

Thrust bearing 56, which can be any type of suitable bearing, reacts against the support block 49 and is used to contain the axial forces generated by the ball ramp rolling elements 20A, 20B and 20C as they engage the ramps 22A, 22B, 22C, 23A, 23B and 23C in the actuation ring 12 and control ring 14 the respectively (see FIG. 4). The annulus 40 rotates relative to the support block 49 which is attached to the flywheel 4 through the pressure plate housing 16. Rotation of the control ring 14 relative to the actuation ring 12 causes the actuation ring 12 to move axially toward the flywheel 4 thereby clamping the first and second clutch discs 10 and 11 between the actuation ring 12 and the flywheel 4. The actuation ring 12 is nonrotatably connected to the support block 49 but can move axially with respect thereto.

The clutch coupling 24 consists of a cone clutch 28, one side of which is clutch ring 35 which is connected to rotate with the annulus 40 of the planetary gearset 21 and the second side is the clutch extension 29. Mating channels 37 extend from the control ring 14 and rotationally engage drive flanges 38 extending from the clutch extension 29 which is attached to the control clutch plate 19 which form the clutch coupling 24. In this manner, the cone clutch 28 frictionally couples the control ring 14 to the clutch ring 35 and thus, to the annulus 40. It is desirable to bond friction material to either the control clutch extension 29 and/or the clutch ring 35 at the cone clutch 28 to provide for the desired torque transfer between these elements when the coil 30 is energized. The clutch extension 29 uses the drive flanges 38 extending therefrom to rotationally drive one side of the cone clutch 28 without radial and axial alignment problems because of the manner in which the drive flanges 38 engage the drive channels 37. Without this type of clutch coupling 24, the cone clutch 28 would tend to bind due to the production tolerances and wear of the components that make up the clutch coupling 24.

According to the present invention, once the clutch assembly 2 is locked-up, the coil pole 32 rotates at the same speed as the flywheel 4 and minimal parasitic electrical power is required to be delivered to the coil 30 to maintain lock-up of clutch assembly 2. Using the teaching of the prior art, the control ring 14 can be reacted against a ground surface, such as the clutch bellhousing 6, although continuous slipping would occur between the control ring 14 resulting in high parasitic energy losses and no automatic activation of the ball ramp mechanism 5 upon clutch slip. As illustrated in the present application, by attaching the control ring 14 to the transmission input shaft 8 through the control clutch coupling 24 planetary gearset 21 controlled by action of secondary one-way clutches 44A, 44B, 44C and 44D acting in conjunction with the primary one-way clutch 60 any relative rotation between the flywheel 4 and the transmission input shaft 8 due to clutch slip will further energize the ball ramp mechanism 5 thereby minimizing clutch slip. Also, the reaction time to even minimal slipping of the clutch discs 10 and 11 when in either the vehicle drive or coast mode using the present invention is virtually instantaneous since slippage of the clutch discs 10 and 11 results in relative motion between the actuation ring 12, and the control ring 14 through the frictionally locked clutch coupling 24 and the planetary gearset 21 on the control ring 14 side and through the pressure plate housing 16 to the actuation ring 12. The actuation ring 12 is rotationally coupled to the clutch pressure plate housing 16 which is in turn connected to the flywheel 4 all rotating together.

The bias spring 26 operating between flange 26A and housing 26B pre-loads the armature to minimize air gap effect when the coil is first energized and functions to eliminate unpredictable engagement of the control coupling 24. If the control coupling 24 is not preloaded, the coil 30 would require a greater level of current to initially pull in the control clutch plate 19 which would result in a greater force at the cone clutch 28 then desired after the control clutch plate 19 transverses the air gap. Any type of device could be utilized to apply a preload force on the control clutch plate 19 or the clutch extension 29 which has the effect of preloading the clutch coupling 24 toward the activation state.

A plurality of pressure plate springs 50 act to pull the ball ramp mechanism 5 including the actuation ring 12 away from the clutch friction discs 10 and 11 and the flywheel 4 by acting as spring elements between the pressure plate housing 16 and the actuation ring 12 thereby biasing the actuation ring 12 away from the flywheel 4. The pressure plate housing 16 is attached to the flywheel 4 such that the actuation ring 12 rotates with the flywheel 4 but can move axially relative to the flywheel 4 as controlled by action of the ball ramp mechanism 5 acting to compress the pressure plate springs 50.

Reference is now made to both FIGS. 1, 2 and 3 where FIGS. 2 and 3 are a partial cross sectional views of the planetary gearset 21 of the present invention taken along line II—II of FIG. 1 with the vehicle in a drive mode and coast mode respectively. FIG. 2 shows the direction of rotation of the sun gear 54 for purposes of this illustration as counterclockwise by arrow S and the annulus 40 as counterclockwise by arrow A and the direction of the clutch ring 35 with arrow C representing the rotation when the driveline is in a drive mode. The clutch ring 35 with the carrier pins 48A, 48B, 48C and 48D is prevented from rotating in a counterclockwise direction relative to the flywheel 4 by action of the primary one-way clutch 60. The inner clutch ring 35A and the outer clutch ring 35B are connected by the carrier pins 48A, 48B, 48C, 48D to form the clutch ring 35. FIG. 3 shows the direction of rotation of the sun gear 54 and the annulus 40 and the direction of rotation of the clutch ring 35 relative to the flywheel 4 where slip of the driveline clutch causes the ball ramp mechanism 5 to activate identical to the activation in the drive mode. FIGS. 2 and 3 appear identical but in FIG. 2, the one-way clutches 44A, 44B, 44C and 44D are locked and in FIG. 3, they are unlocked. The internal forces change direction from FIG. 2 to those in FIG. 3 but the direction of rotation of the elements as denoted by arrows A, C and S are the same. The planetary gearset 21 is disposed to rotate the control ring 14 in a direction to further activate the ball ramp mechanism 5 regardless of whether the vehicle is operating in a drive mode or a coast mode.

The planetary gearset 21 is comprised of a plurality of planet gears 42A, 42B, 42C and 42D supported on respective secondary one-way clutches 44A, 44B, 44C and 44D each of which are nonrotatably supported on respective carrier pins 48A, 48B, 48C and 48D. Note that with the planetary gearset 21 any number of planet gears and associated support pins could be utilized. The planet gears 42A, 42B, 42C and 42D then mesh with the annulus 40 which is rotatably supported by the support block 49 which rotates with the flywheel 4. The annulus 40 is connected to and rotates with the clutch ring 35. The planet gears 42A, 42B, 42C and 42D are held in axial position by the outer clutch ring 35B which is attached to the primary one-way clutch 60 all rotating around the axis of rotation 47. The primary one-way clutch 60 prevents the clutch ring 35 of the planetary gearset 21 from rotating in a direction that would, when operating in conjunction with the secondary one-way clutches 44A, 44B, 44C and 44D, result in a deactivation of the ball ramp mechanism 5.

Upon energization of the coil 30, the planetary gearset 21 operating in conjunction with the primary one-way clutch 60 provides for relative rotation of the control ring 14 and the actuation ring 12 only in a direction which results in further activation of the ball ramp mechanism 5 and increases clamping force on the clutch discs 10 and 11 regardless of the operational mode of the vehicle and torque flow through the driveline.

Axial forces generated by the ball ramp mechanism 5 are transmitted by the thrust bearing 56 into the support blocks 49 which is attached to the flywheel 4 through the pressure plate housing 16. In the opposite direction, the force generated by the ball ramp mechanism 5 is transmitted to the clutch discs 10 and 11 and the flywheel 4. It should be noted that any number of clutch discs could be utilized including only one clutch disc without the intermediate pressure plate 13A.

In FIG. 2, arrow S denotes the relative direction of rotation of the sun gear 54, arrow A denotes the relative direction of rotation of the annulus 40, arrow C denotes the relative direction of rotation of the clutch ring 35. The annulus 40 is nonrotatably connected to the support block 49. The cone clutch 28 friction surface frictionally couples the clutch ring 35 to the control ring 14 through the clutch extension member 29 when the coil 30 is energized. The planet gears 42A, 42B, 42C and 42D are rotatably supported by respective support pins 48A, 48B, 48C and 48D which are attached to the inner clutch ring 35A and outer clutch ring 35B. The planetary gearset 21 has a sun gear 54 which is nonrotatably connected to the transmission input shaft 8. The sun gear 54 is shown rotating in a counterclockwise direction driven by the engine and since the planet gears 42A, 42B, 42C and 42D are locked, the annulus 40 rotates with the sun gear 54. Thus, any slippage of the friction discs 10A, 10B results in a further activation of the ball ramp mechanism 5 so as to increase the clamping load on the friction discs 10A and 10B.

FIG. 3 is a partial cross sectional view of the clutch assembly 2 of FIG. 1 taken along line II—II showing the relative rotation of the planetary gearset 21 when the vehicle is in the coast mode. The clutch ring 35 and the attached carrier pins 48A, 48B, 48C and 48D are rotating with the engine flywheel 4 since the secondary one-way clutches 44A, 44B, 44C and 44D are locked and prevent the planet gears 42A, 42B, 42C and 42D from rotating in a counterclockwise direction. The ball ramp mechanism 5 is thereby further energized when slippage occurs between the flywheel 4 and the friction disc 10A and 10B identical to that produced as the result shown in FIG. 2.

Referring now to FIGS. 4, 5 and 6 to describe the operation of the ball ramp mechanism 5, a cross-sectional view of the ball ramp mechanism 5 is shown in FIG. 4 and views taken along line IV—IV of the actuation ring 12 and the control ring 14 separated by a spherical element 20A are shown in FIGS. 5 and 6. Three spherical rolling elements 20A, 20B and 20C are spaced approximately 120° apart rolling in three ramps 22A, 22B and 22C having a variable axial depth respectively as the control ring 14 is rotated relative to the actuation ring 12. Any number of spherical rolling elements 20A, 20B and 20C and respective ramps 22A, 22B, 22C, 23A, 23B and 23C could be utilized depending on the desired rotation and axial motion of the ball ramp mechanism 5. It is mandatory to employ at least three spherical rolling elements 20A, 20B and 20C traveling on a like number of identical equally spaced opposed ramps 22A, 22B, 22C, 23A, 23B and 23C formed respectively in both the actuation ring 12 and the control ring 14 to provide axial and radial stability to the control ring 14 and the actuation ring 12. As mentioned previously, any type of rolling elements could be utilized such as a ball or a cylindrical roller. The actuation ring 12 is shown which rotates with the flywheel 4, the pressure plate housing 16 and the support block 49, turning about axis of rotation 47 coincident with the axis of rotation of the transmission input shaft 8.

Three semi-circular, circumferential ramps 22A, 22B and 22C are shown formed in the face of the actuation ring 12 with corresponding identical opposed ramps 23A, 23B and 23C formed in the face of the control ring 14. The control ring 14 and the actuation ring 12 are made of a high strength steel and the unidirectional tapered ramps 22A, 22B, 22C, 23A, 23B and 23C carburized and hardened to $R_c$55–60. The ramps 22A, 22B, 22C, 23A, 23B and 23C are tapered in depth as more clearly shown in FIG. 5 by references to ramps 22A and 23A and circumferentially extend for approximately 120° (actually less than 120° to allow for a separation section between the ramps). The separation 66 between the control ring 14 and the actuation ring 12 is determined by the rotational orientation between the two corresponding opposed ramps such as 22A and 23A where the spherical rolling element 20A rolls on both ramps 22A and 23A as the control ring 14 is rotated relative to the actuation ring 12 on the same axis of rotation. In a substantially identical manner, rolling element 20B rolls on both ramps 22B and 23B and rolling element 20C rolls on both ramps 22C and 23C. The relative rotation forces the two rings 14, 12 axially apart or allows them to come closer together as determined by the position of the rolling elements 20A, 20B and 20C or their respective ramp pairs 22A, 23A and 22B, 23B and 22C, 23C thereby providing an axial movement for clamping and releasing the clutch disc 10 between the actuation ring 12 and the flywheel 4.

FIG. 5 illustrates the rotational orientation of the control ring 14 and the actuation ring 12 when the separation 66 is at a minimum when the ramps 22A and 23A are at one extreme in alignment and the spherical element 20A is in the deepest section of the ramps 22A and 23A. Assuming there is a rotational speed difference the flywheel 4 and the transmission input shaft 8, upon energizing the coil 30, the control ring 14 is rotated relative to the actuation ring 12 by application of a rotational torque input through the clutch coupling 24 and the ramps 22A and 23A move relative to one another causing the spherical element 20A to roll on each of the ramp surfaces 22A and 23A moving to a different position on both ramps 22A and 23A thereby forcing the control ring 14 and the actuation ring 12 apart to a wider separation 66 as shown in FIG. 6. A similar separation force is generated by rolling element 20B rolling on ramp surfaces 22B and 23B and by rolling element 20C rolling on ramp surfaces 22C and 23C. The rotation of the control ring 14 is clearly illustrated by reference to FIGS. 5 and 6 by the relative shift in position of reference points 62 and 64 from directly opposed in FIG. 5 to an offset position in FIG. 6 caused by rotation of the control ring 14 in the direction of the arrow 70. This increase in axial displacement can be used for a variety of applications, and especially driveline clutches, since the force level relative to the torque applied to the control ring 14 is quite high, typically a ratio of 100:1. This can be used as illustrated in this application to load an actuation ring 12 against clutch discs 10 and 11 and flywheel 4 in a vehicle driveline. Additional illustrative details of operation of a ball ramp actuator can be found by reference to U.S. Pat. No. 4,805,486.

If the flywheel 4 is rotating at the same speed as the transmission input shaft 8, even if the coil 30 is energized, the control ring 14 rotates at the same speed as the actuation ring 12 and no additional axial force is generated by the ball ramp mechanism 5 since there is no relative rotation between the control ring 14 and the actuation ring 12. Assuming the coil 30 remains energized thereby electromagnetically tying the control ring 14 to the transmission input shaft 8 through the clutch coupling 24, coil pole 32 and the planetary gearset 21 according to the present invention, any relative rotation between the flywheel 4 and the transmission input shaft 8, results in relative rotation between the control ring 14 and the actuation ring 12 in a direction which causes the spherical elements 20A, 20B and 20C to further increase the separation 66 between the control ring 14 and the actuation ring 12 thereby generating additional clamping force by the actuation ring 12 so as to use the power of the flywheel to increase the lock-up force on the clutch disc 10.

According to the present invention, the vehicle driveline clutch actuator can be used to couple a rotating input shaft to an output shaft where the input shaft would be analogous to the flywheel 4 and the output shaft would be analogous to the transmission input shaft 8 as shown in FIG. 1. The present invention would prevent the ball ramp mechanism 5 from retracting and disengaging the clutch discs 10 and 11 so long as the coil 30 was energized thereby providing a friction coupling between the input element (flywheel) and the output element (transmission input shaft) irregardless of the direction of the torque transfer.

This invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

We claim:

1. A ball ramp actuator for rotationally coupling two rotating elements comprising:

an input element driven by a prime mover and rotating about an axis of rotation;

an output element having an axis of rotation coaxial with said axis of rotation of said input element for rotating an output device;

a ball ramp mechanism for generating an axial movement comprising; an annular control ring having an axis of rotation, said control ring having a plurality of circumferential control ramps formed in a first face of said control ring, said control ramps varying in axial depth, an equivalent number of rolling elements one occupying each of said control ramps, an actuation ring having an axis of rotation coaxial with said axis of rotation of said control ring, said actuation ring having a plurality of actuation ramps substantially identical in number, shape and radial position to said control ramps where said actuation ramps at least partially oppose said control ramps and where each of said rolling elements is contained between one of said actuation ramps and a respective control ramp, said control ring being axially and rotationally moveably disposed relative to said actuation ring;

a planetary gearset having an annulus frictionally rotationally connected to said control ring with a clutch coupling where a plurality of planet gears engage both said annulus and a sun gear, said sun gear nonrotatably coupled to said output element and said planet gears are each rotatably supported on respective secondary one-way clutches mounted on respective carrier pins where said carrier pins are supported on a clutch ring;

a coil for inducing an electromagnetic field in said clutch coupling; and a primary one-way clutch connected to said input element and connected to said clutch ring operating to prevent said clutch ring from rotating with respect to said input element in a direction resulting in deactivation of said ball ramp mechanism;

where said secondary one-way clutches operating within said planetary gearset provides rotation of said control ring relative to said actuation ring in a direction to activate said ball ramp mechanism irrespective of the relative rotation of said input element and said output element.

2. The ball ramp actuator of claim 1, wherein said control ramps and said actuation ramps have a continuously increasing axial depth.

3. The ball ramp actuator of claim 1, wherein said clutch coupling comprises: a control clutch plate moving in response to said electromagnetic field; a clutch extension attached to said control clutch plate; and said clutch ring frictionally rotationally engaging said clutch extension, where said clutch ring and said clutch extension form a cone clutch.

4. The ball ramp actuator of claim 3, wherein said coil encircles said output element.

5. The ball ramp actuator of claim 4, further comprising a control unit electrically connected to said coil for supplying electrical energy to said coil.

6. The ball ramp actuator of claim 3, wherein said control clutch plate is connected to said clutch extension which is substantially nonrotatably connected to said control ring, where said clutch extension frictionally engages said clutch ring when said coil is energized.

7. The ball ramp actuator of claim 3, wherein said control clutch plate is connected to said clutch extension which is substantially nonrotatably connected to said control ring, where said clutch extension frictionally engages said clutch ring at an inner clutch ring which is connected to an outer clutch ring by said carrier pins.

8. The ball ramp actuator of claim 1, wherein said input element is a flywheel and wherein said output element is a transmission input shaft and where said output device is a transmission.

\* \* \* \* \*